United States Patent [19]

Tsukada

[11] Patent Number: 5,090,821
[45] Date of Patent: Feb. 25, 1992

[54] ROLLER BEARING AND ROLLER TYPE LINEAR GUIDE APPARATUS

[75] Inventor: Toru Tsukada, Maebashi, Japan

[73] Assignee: Nippon Seiko Kabushiki Kaisha, Tokyo, Japan

[21] Appl. No.: 660,342

[22] Filed: Feb. 22, 1991

[30] Foreign Application Priority Data

Feb. 28, 1990 [JP] Japan .................. 2-19958[U]
Feb. 28, 1990 [JP] Japan .................. 2-19959[U]

[51] Int. Cl.$^5$ ........................................... F16C 29/06
[52] U.S. Cl. ........................................... 384/44
[58] Field of Search .................. 384/44, 43, 45; 464/168

[56] References Cited

U.S. PATENT DOCUMENTS 4,558,910 12/1985 Teramachi .
4,659,238 4/1987 Teramachi ..................... 384/44

FOREIGN PATENT DOCUMENTS 62-63214 3/1987 Japan .

Primary Examiner—Lenard A. Footland
Attorney, Agent, or Firm—Basile and Hanlon

[57] ABSTRACT

A roller type linear guide apparatus includes a guide rail having V-shaped roller rolling grooves, respectively formed in lateral side surfaces, and a slider having V-shaped bearing mounting grooves respectively formed in inner surfaces of both side walls. A roller bearing which is mounted to each of the V-shaped bearing mounting grooves of the slider includes a pair of roller rows, and each row of rollers circulate along an elliptic infinitely circulating path. Circulating planes respectively containing the elliptic infinitely circulating paths of the two roller rows of the roller bearing are inclined to intersect each other so that loaded rollers of one of the two roller rows roll on one inclined surface of the V-shaped roller rolling groove and loaded rollers of the other of the two roller rows roll on the other inclined surface of the V-shaped roller rolling groove of the guide rail. Each roller bearing is secured to the V-shaped bearing mounting groove by two bolts which are screwed into bolt screw holes respectively formed in the inclined surfaces of the V-shaped bearing mounting groove.

6 Claims, 8 Drawing Sheets

ROLLER BEARING AND ROLLER TYPE LINEAR GUIDE APPARATUS

BACKGROUND OF THE INVENTION

1. Field of the Invention

The present invention relates to a roller bearing having two rows of infinitely circulating roller rows, and to a roller type linear guide apparatus including a slider which moves linearly on a guide rail through the roller bearing.

2. Description of the Prior Art

A prior art roller type linear guide apparatus provided with a roller bearing of this type is known, for example, from U.S. Pat. No. 4,558,910. This linear guide apparatus, as shown in FIG. 13, includes a track base (guide rail) 11 extending in a longitudinal direction, a movable table (slider) 12 which is a long block body having a substantially inverted U-shaped cross section and disposed straddling the track base 11, and V type roller bearings 1 interposed between the track base 11 and the movable table 12. The tack base 11 is formed with ridges on both lateral sides so that the ridges extend horizontally and outwardly. Each of the ridges has at an extreme end, loaded roller rolling surfaces 13 constituted by upper and lower slant surfaces. On the other hand, the movable table 12 has a pair of V-shaped grooves 14 formed in inner surfaces of both side walls extending in the longitudinal direction, and has a bolt through hole 15 penetrating each of the side walls from a bottom of the V-shaped groove 14 to an outside surface of the side wall.

The V-shaped roller bearing 1 includes a bearing body 6 which is a long block body having a substantially square cross section, and it is provided with protruding ridges 2 and 3 respectively protruding from the centers of inner inclined surfaces 1a and 1a. The protruding ridges 2 and 3 have a track-like planar shape, and loaded roller surfaces 4 and 4 are formed on one side surfaces, and non-loaded roller surfaces 5 and 5 are formed on the other side surfaces. Cylinder rollers 7 circulate along a pair of loaded roller surface 4 and non-loaded roller surface 5. Roller retainers 8 and 8 are provided in parallel with respective inner inclined surfaces 1a and 1a of the bearing body 6 so as to guide the rollers 7 circulatably with a minute gap between an end face of the cylinder roller 7 and the roller retainer 8. The bearing body 6 is formed with a fixing screw hole 9 which penetrates from an edge at which outer inclined surfaces 1c and 1d intersect toward the inside of the bearing body 6 along a diagonal line.

The V-type roller bearings 1 and 1 are respectively fitted into the V-shaped grooves 14 and 14 of the movable table 12 so that the outer inclined surfaces 1c and 1d of each V-type roller bearing 1 are in contact with the inner surfaces of the V-shaped groove 14. A bolt 16 which passes through the bolt through hole 15 engages the fixing screw hole 9 to secure the V-type roller bearing 1 to the movable table 12. Thus the loaded rollers B1 are in contact with the loaded roller rolling surfaces 13 of the track base 11 and roll as the movable table 12 is moved.

In the prior art roller type linear guide apparatus, the loaded rollers B1 of the V-type roller bearing 1 are disposed on the inner surfaces inclined in a V shape. These upper and lower loaded rollers B1 and B1 which are disposed close to each other sandwich the V-shaped loaded roller rolling surfaces 13 and 13 formed on the extreme end of the ridge protruding horizontally from the track base 11. However, the V-type roller bearing 1 is merely secured to the movable table 12 with the bolt 16 which extends in only one direction horizontally. As a result, a problem is involved in that the rigidity is low with respect to a moment load M in a rolling direction of the movable table 12.

Furthermore, in the prior art roller bearing 1, the cylindrical roller 7 is merely held circulatably by the roller retainer 8 fixed to the bearing body 6 with the minute gap between the end face of the cylindrical roller 7 and the roller retainer 8. As a result, when the V-type roller bearing 1 is removed from the track base 11, the loaded rollers B1 will fall off the V-type roller bearing 1.

Accordingly, in order to prevent the fall off of the rollers, and to facilitate the assembling of the V-type roller bearing 1, it has been proposed as shown in FIG. 14, to fix a fall-off preventing roller retainer 17 to an inner recessed portion of the bearing body 6. The roller retainer 17 has a substantially U-shaped cross section and extends in the longitudinal direction thereby to hold a part of an inner peripheral surface of the loaded roller B1 rollably. However, in this case, since the roller retainer 17 is a long member having a complicated cross sectional shape, a problem arises in that the manufacture is troublesome, the cost of a metal mold is expensive, and the rolling of the loaded roller B1 is apt to be hindered due to a manufacture error and an assemble error.

Furthermore, in the prior art V-type roller bearing 1, since the screw hole 9 for the fixing bolt is formed in the bearing body 6 diagonally from the edge at which the outer inclined surfaces 1c and 1d intersect towards the inside of the bearing body 6, there is a problem in that the hole forming work and the tapping work for the bolt screw hole 9 are very difficult.

Moreover, since the V-type roller bearing 1 is fixed by the bolt 16 from only one direction, another problem is present in that when an intersection angle between the inclined surfaces 1c and 1d is small, looseness or shake is apt to be produced easily when a fixing angle is deviated even slightly. Specifically, the intersection angle between the inclined surfaces 1c and 1d of the roller bearing 1 is not always exactly the same as the intersection angle between the corresponding inner inclined surfaces of the V-shaped roller mounting groove of the slider due to manufacture error of the product. When the intersection angle between the inclined surfaces 1c and 1d of the roller bearing 1 is smaller than that of the V-shaped roller mounting groove, a gap will be caused between one of the inclined surfaces 1c and 1d and its corresponding inner inclined surface of the roller mounting groove, or gaps will be caused at both sides of the inclined surfaces of the roller bearing 1. In this case, since the roller bearing 1 is secured to the V-shaped roller mounting groove with the single bolt 16 which passes through the apex of the inclined surfaces 1c and 1d of the roller bearing 1, the roller bearing 1 is apt to be shaked due to the presence of the gap or gaps. Thus, even when the bolt 16 is clamped securely, the rigidity of the roller bearing with respect to the V-shaped roller mounting groove is small.

SUMMARY OF THE INVENTION

The present invention was made to solve the problems in the prior art, and it is an object of the invention to provide a roller bearing provided with a roller retainer which is easy in manufacturing, inexpensive, and does not hinder the rolling of loaded rollers, and the tapping work for forming a fixing bolt hole in the roller bearing is very easy, and the roller bearing can be fixed securely without producing looseness or shake.

It is another object of the present invention to provide a roller type linear guide apparatus which uses the roller bearing mentioned above, and which has high rigidity with respect to a moment load.

A roller type linear guide apparatus in the present invention includes a guide rail extending in an axial direction, and a slider supported by the guide rail through at least a pair of roller bearings so that the slider moves in the axial direction through rolling of rollers. The guide rail has a pair of V-shaped roller rolling grooves formed in both lateral side surfaces so that the V-shaped grooves open outwardly, and the slider has a pair of V-shaped bearing mounting grooves formed in inner surfaces of both side walls so that the pair of V-shaped bearing mounting grooves respectively confront the pair of V-shaped roller rolling grooves of the guide rail. The pair of roller bearings each having two rows of infinitely circulating roller rows are respectively mounted to the pair of V-shaped bearing mounting grooves. In each of the roller bearings, two circulation surfaces for the two rows of infinitely circulating roller rows are formed to intersect in a V shape, and loaded rollers of one row of the two roller rows are rolling on one inclined surface of the V-shaped roller rolling groove of the guide rail, and loaded rollers of the other row of the two roller rows are rolling on the other inclined surface of the V-shaped roller rolling groove of the guide rail.

In the roller type linear guide apparatus described above, a bolt screw hole is formed in each of the inclined surfaces of the V-shaped bearing mounting groove of the slider, and the roller bearing may be fixed to the slider by a bolt which is screwed into the bolt screw hole.

Furthermore, the roller type linear guide apparatus may be modified in which a plane track surface is formed on an upper surface of the guide rail, and a recess is formed in a lower surface of the slider to confront the plane track surface. A flat-type roller bearing is mounted to the recess so that loaded rollers of the flat-type roller bearing roll on the plane track surface.

A roller bearing in the present invention includes a bearing body having a substantially V-shaped cross section and extending long in an axial direction. The V-shaped bearing body has two inner side surfaces extending longitudinally, and each of the two inner side surfaces is formed with a pair of parallel roller paths partitioned by a partition wall extending in the axial direction. A plurality of through holes are formed in the bearing body and each of the through holes penetrates from an upper surface of the partition wall through an opposing outer side surface of the bearing body. End caps are respectively fixed to axial opposite ends of the bearing body, and each end cap has two curved paths so that each curved path makes the pair of roller paths of the bearing body communicate to each other. A multiplicity of cylindrical rollers are rollably inserted in elliptic infinitely circulating paths respectively formed by the roller paths and the curved paths. Each of the cylindrical rollers has slant narrow surfaces formed on opposite circumferencial edges. A first roller retainer is provided, and the first roller retainer covers most of end faces of the cylindrical rollers from the outside and has a fall-off preventing projection edge formed on at least one side edge which is close to one slant surface of the cylindrical roller. The first roller retainer is secured to upper surface of the partition wall of the bearing body. A second roller retainer is further provided, and the second roller retainer is of an axially long strip shape, and both side edges extending in the longitudinal direction are respectively positioned close to the other slant surfaces of the cylindrical rollers of the two roller rows.

The first roller retainer has an L-shaped cross section, and one side of the L-shaped roller retainer has the fall-off preventing projection edge and covers the end faces of loaded rollers and non-loaded rollers from the outside, and the other side of the roller retainer covers cylindrical side surfaces of the non-loaded rollers from the outside.

Furthermore, the first roller retainer may be of a flat shape to cover the loaded rollers and the non-loaded rollers in the roller paths of the same circulating path, and fall-off preventing projection edges are formed on both side edges.

As described in the foregoing, in the roller type linear guide apparatus of the present invention, the loaded rollers of different circulating paths of the roller bearing are disposed respectively on outer side surfaces of the roller bearing in a vertical relationship. The roller bearing is securely fixed to the V-shaped bearing mounting groove of the slider by two bolts in two different directions along a load direction of the moment load. The loaded rollers of the roller bearing which is secured to the slider respectively abut against the upper and lower inclined surfaces of the V-shaped roller rolling groove of the guide rail, and the loaded rollers bear the load in a vertical and spaced positional relationship. As a result, the rigidity against the moment load in the rolling direction of the slider is high.

In the roller bearing of the present invention, each of the cylindrical rollers which roll the roller paths of the bearing body has slant surfaces formed respectively in the opposite circumferencial edges. One of the slant surfaces is held by the fall-off preventing projection edge of the first roller retainer, and the other of the slant surfaces is held by the side edge of the second roller retainer. Accordingly, it is possible to perfectly prevent the cylindrical rollers from falling off the roller bearing. Furthermore, since the second roller retainer is not formed in a complicated shape as is the case in the prior art roller retainer, and it has a simple shape, the manufacture is simple and thus it is inexpensive. Further, the manufacture error and the assemble error can be easily adjusted, and the rolling of the cylindrical rollers is not disturbed.

Furthermore, since each of the through holes for the fixing bolts of the roller bearing is formed to penetrate at a right angle from the outer side surface of the V-shaped bearing body to the opposite inner side surface, the tapping work is very simple. Since the bearing body is fixed by two bolts from the V-shaped outer inclined surfaces in the two directions, the roller bearing can be secured to the slider without producing looseness.

DESCRIPTION OF THE PREFERRED EMBODIMENTS

Figure 1:
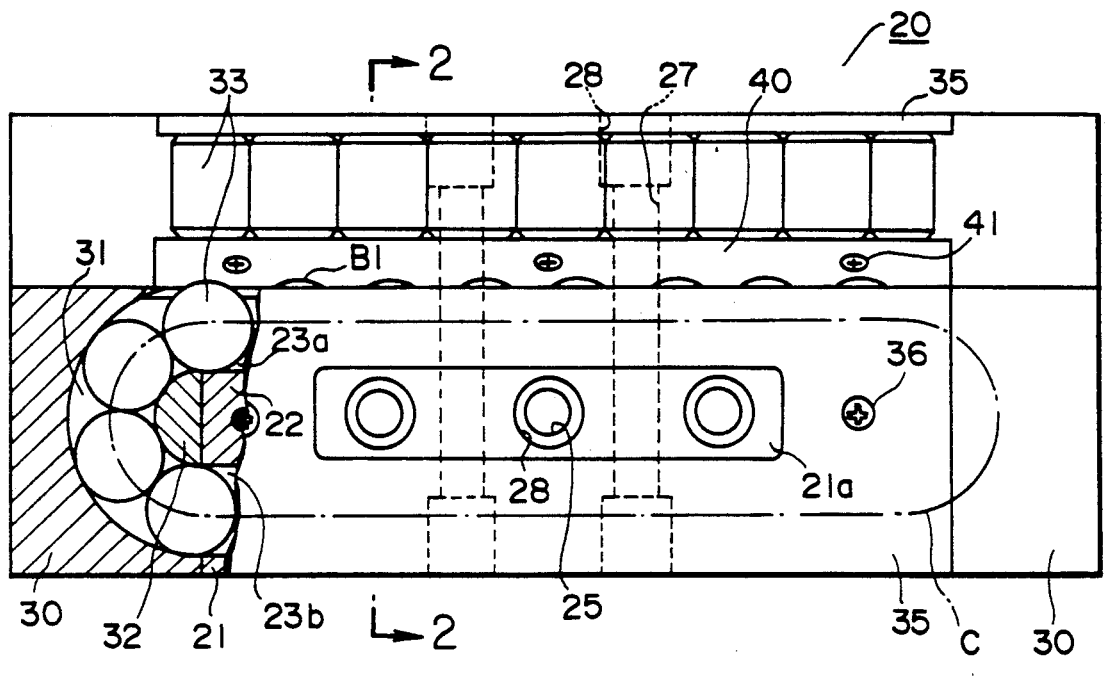
FIG. 1 is a side view with a part thereof in cross section of a first embodiment of a roller bearing in the present invention.
Figure 2:
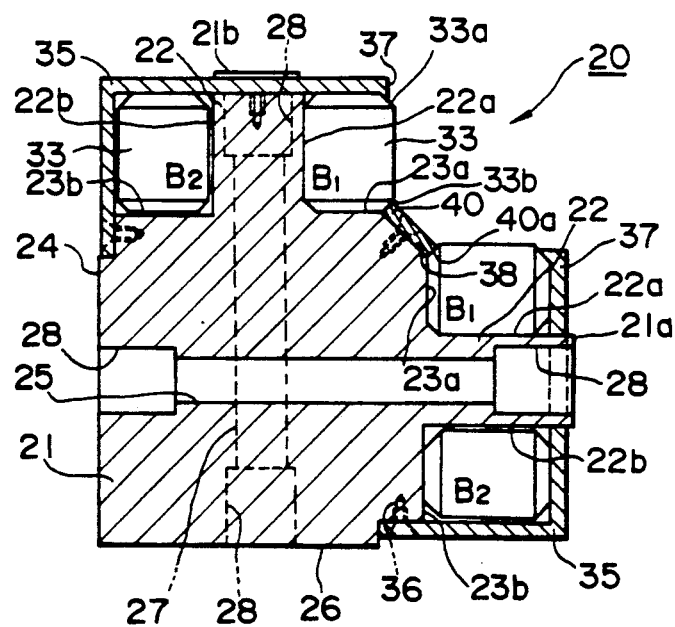
FIG. 2 is a sectional view taken along the line II—II in FIG. 1.

FIGS. 1 and 2 show a first embodiment of a roller bearing in the present invention.

A bearing body 21 of a roller bearing 20 in this embodiment has a cross section of a substantially orthogonal V shape and extends long in an axial direction. In this substantially orthogonal V-shaped cross section, as shown in FIG. 2, two outer side surfaces 24 and 26 are orthogonal to each other to form a V character shape (in the description, the side surfaces 24 and 26 are referred to "outer", because in a typical embodiment, these side surfaces 24 and 26 protrude outwardly from V-shaped roller bearing mounting grooves of a slider when the roller bearing is fixed to the slider), and two inner side portions 21a and 21b (these portions are referred to as "inner" surfaces, because these portions are accommodated within the V-shaped roller bearing mounting grooves of the slider) also extend in the axial direction. In each of the inner side portions 21a and 21b, an outer edge portion and an inner edge portion are cut out at right angle in a step shape to form a partition wall 22 extending in the longitudinal direction and a pair of parallel roller paths 23a and 23b. An inner wall surface 22a of the partition wall 22 (at the side of the roller path 23a) constitutes a loaded roller rolling surface, and an outer wall surface 22b of the partition wall 22 (at the side of the roller path 23b) constitutes a non-loaded roller rolling surface.

In the bearing body 21, a plurality of bolt through holes 25 (in FIG. 1, three holes) are formed penetrating from the top surface 21a of the partition wall 22 to further penetrate the opposing outer side surface 24, and a plurality of bolt through holes 27 (in FIG. 1, two holes) are formed penetrating from the top surface 21b of the other partition wall 22 to further penetrate the opposing outer side surface 26. Each of the bolt through holes 25 and 27 has a spot facing 28 formed therein.

End caps 30 having a cross section of a substantially orthogonal V-shape are respectively joined to opposite ends of the bearing body 21. Each of the end caps 30 has curved paths 31 formed in a joining end surface, and each curved path 31 communicates the pair of parallel roller paths 23a and 23b to form an elliptic infinitely circulating path C together with the curved paths 31 of the end caps 30. The reference numeral 32 designates a half-column like return guide which forms an inner wall surface of the curved path 31, and the the return guide 32 is fixed to the end face of the end cap 30. A multiplicity of cylindrical rollers 33 are rollably inserted in the infinitely circulating path C. Each cylindrical roller 33 has an outer slant surface 33a and an inner slant surface 33b formed by chamfering opposite circumferencial edges of the cylindrical roller 33.

A pair of first roller retainers 35 and 35 having an L-shaped cross section and formed in an L plate shape are fixed by small screws 36 to the bearing body 21 having the cylindrical rollers 33 inserted therein. One of the first roller retainers 35 and 35 covers the inner side surface 21a and extending to the outer side surface 26, and the other first roller retainer 35 covers the inner side surface 21b and extending to the outer side surface 24. Each of the first roller retainers 35 and 35 has a size sufficient to cover most of the outer end faces of the cylindrical rollers 33 placed in the infinitely circulating path C so that the rollers 33 are rollable with a minute gap between the end faces of the rollers 33 and the first roller retainer 35, and at the same time, the first roller retainer 35 covers the whole cylindrical surfaces of the non-loaded rollers B2 placed in the outer roller path 23b so that the non-loaded rollers B2 are rollable. Furthermore, the first roller retainer 35 has a fall-off preventing projection edge 37 formed on an axially extending inner side edge, and the fall-off preventing projection edge 37 is formed to match the shape of the outer slant surface 33a of the loaded rollers B1 placed in the inner roller path 23a.

Furthermore, a second roller retainer 40 formed of an axially long strip-like plate is fixed by small screw 41 to a plane portion 38 having a small width and extending axially in the bearing body 21, and the plane portion 38 is formed in an inner recess (a bottom of valley) of the V-shaped bearing body 21 between the inner side surface 21a and 21b. Both side edges 40a of the second roller retainer 40 are formed to extend in the longitudinal direction and to be close to the inner slant surfaces 33b of the loaded rollers B1 in the roller paths 23a of the respectively different circulating paths. Specifically, in this embodiment in which the bearing body 21 has the orthogonal V-shaped cross section, the inner slant surface 33b of the roller B1 has a slant angle of 45 degrees, and in correspondence to this, both the side edges 40a of the second roller retainer 40 has perpendicular surfaces.

Next, the operation will be described.

For each of the loaded rollers B1, the outer slant surface 33a is held by the fall-off preventing projection edge 37 of the first roller retainer 35, and at the same time, the inner slant surface 33b is held by the side surface 40a of the second roller retainer 40. As a result, the loaded rollers B1 does not fall off.

Each of the non-loaded rollers B2 is covered most part thereof by the L-shaped first roller retainer 35, and it does not fall off.

Since the first roller retainer 35 is of a simple L-shaped plate, and since the second roller retainer 40 is of a further simple long plate member, the first and second roller retainers 35 and 40 can be manufactured at low cost. Furthermore, since the shape is also simple, even when a manufacture error and an assemble error are present, the errors can easily adjusted by simply displacing the position, and the rolling of the cylindrical rollers is not disturbed.

The bolt through holes 25 and 27 are respectively orthogonal to the inner side surfaces 21a and 21b which extend in the longitudinal direction of the bearing body 21, and the bolt through holes 25 and 27 are formed to further penetrate the outer side surfaces 24 and 26 which are opposing the inner surfaces 21a and 21b. As a result, the tapping work is very easy.

Figure 5:
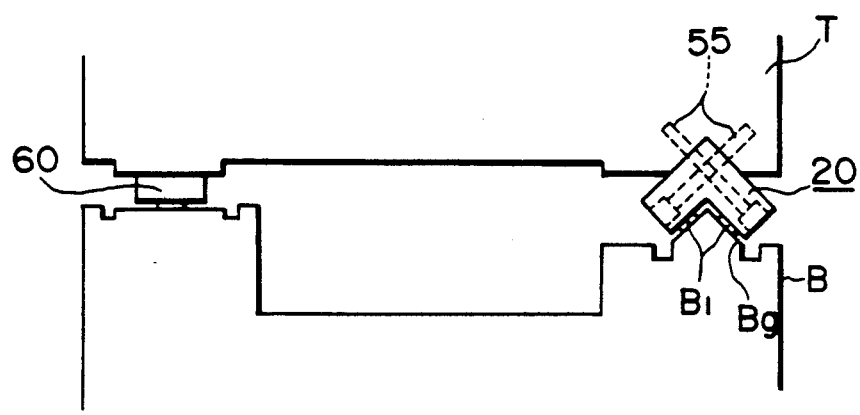
FIGS. 5 to 8 are schematic views showing various modes of use of the roller bearing in the present invention.

In mounting the roller bearing 20, for example, to a machine table T shown in FIG. 5, two bolts 55 are respectively inserted through the bolt through holes 25 and 27, and the roller bearing 20 is clamped by the bolts 55 from two intersecting directions. Accordingly, the roller bearing 20 can be fixed securely without producing looseness.

The machine table T having the roller bearing 20 attached thereto is mounted on a machine bed B, and a load is beared by the loaded rollers B1. When the machine table T is driven, the loaded rollers B1 roll on a guide surface Bg of an inverted V shape provided on the machine bed B. With the movement of the machine table T, the roller rows of the cylindrical rollers 33 move circulating in the infinitely circulating paths C, and the smooth travelling of the machine table T is carried out.

Figure 3:
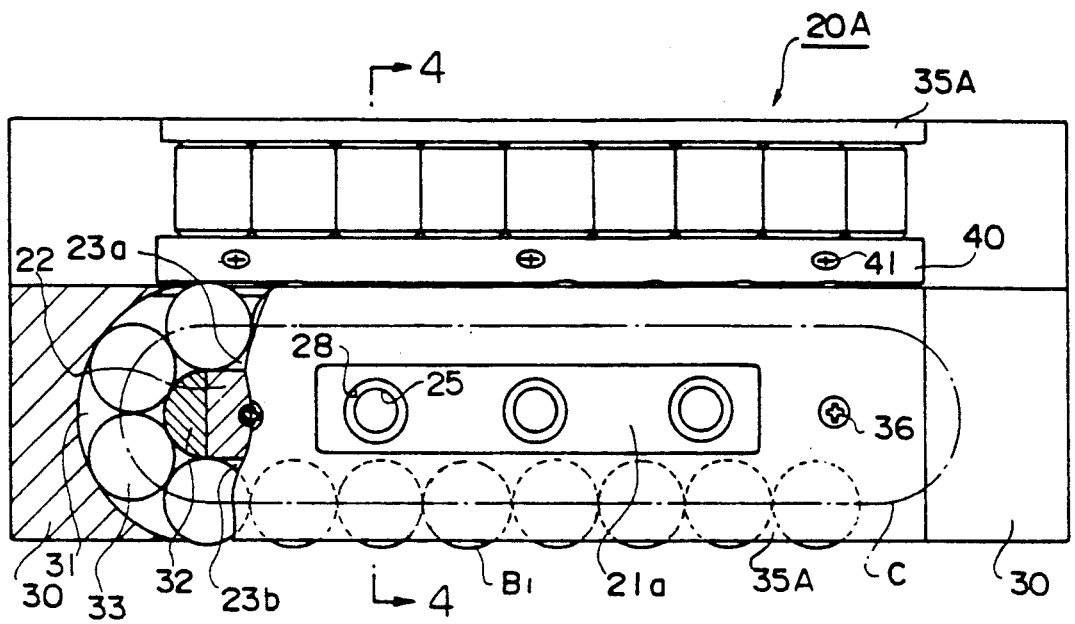
FIG. 3 is a side view with a part thereof in cross section of a second embodiment of a roller bearing in the present invention.
Figure 4:
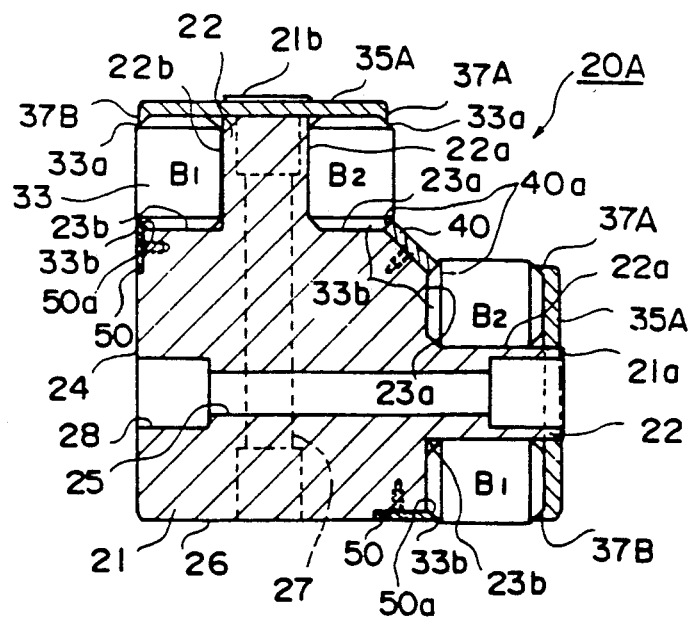
FIG. 4 is a sectional view taken along the line IV—IV in FIG. 3.

FIGS. 3 and 4 show a second embodiment of a roller bearing in the present invention.

In a roller bearing 20A, loaded rollers B1 among cylindrical rollers 33 are disposed at outer sides of a bearing body 21, that is, adjacent to outer side surfaces 26 and 24. Thus, in order to expose the cylindrical surface of the loaded roller B1, a first roller retainer 35A is not of the L shape, it is formed in a plate shape, and fall-off preventing projection edges 37A and 37B are respectively formed on an inner side edge and an outer side edge of the axially extending roller retainer 35A. The fall-off preventing projection edges 37A on the inner side edge corresponds to an outer slant surface 33a of a non-loaded roller B2 in a roller path 23a, and on the other hand, the fall-off preventing projection edge 37B on the outer edge of the roller retainer 35 corresponds to an outer slant surface 33a of the loaded roller B1 in a roller path 23b. The reference numeral 50 designates a third roller retainer which has a long plate like shape and which has a fall-off preventing projection edge 50a corresponding to an inner slant surface 33b of the loaded roller B1, and the third roller retainer 50 is fixed to an outer side surface 24 of the bearing body 21. Another third roller retainer 50 of the same structure is fixed to an outer side surface 26 of the bearing body 21.

The other structure and operation are the same as the first embodiment described in the foregoing.

Figure 6:
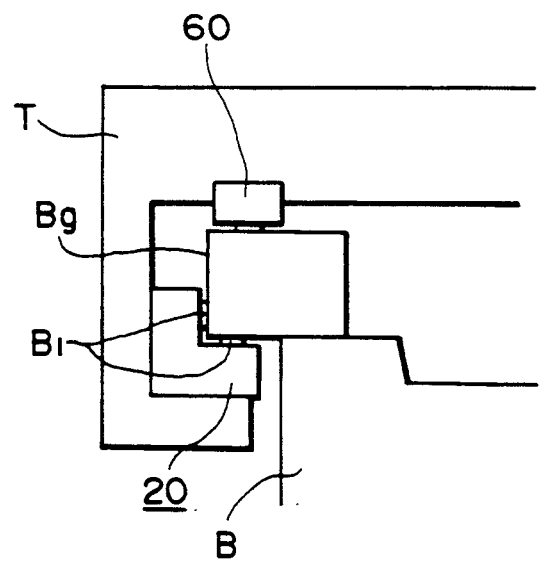

FIGS. 5 and 6 show modes of use of the roller bearing 20 of the type of the first embodiment in which the loaded rollers B1 are disposed at the inner sides of the bearing body 21. In the case of FIG. 5, an inverted V-shaped guide surface Bg is provided on one side of a machine bed B, and the V type roller bearing 20 of the present invention is mounted on one side of a lower surface of a machine table T which moves linearly by being guided by the inverted V-shaped guide surface Bg. At the same time, a flat type roller bearing 60 having a rectangular shape is mounted on the other side of the lower surface of the machine table T. In the case of FIG. 6, square type guide surfaces Bg (only one is shown) are provided on both sides of the machine bed B, and the V type roller bearing 20 of the present invention is on an inner corner of the machine table T which is formed in a C shape to surround one outer corner of the square type guide surface Bg. Furthermore, the flat type roller bearing 60 is mounted on a flat portion of the inner surface of the machine table T. In either case, since one roller bearing 20 bears loads from two directions, it corresponds two flat type roller bearings 60. As a result, the number of roller bearings to be used is decreased and it becomes inexpensive.

Figure 7:
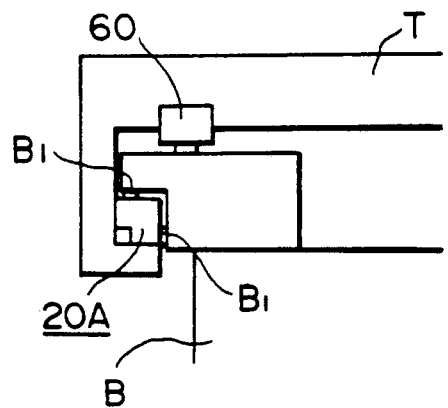
Figure 8:
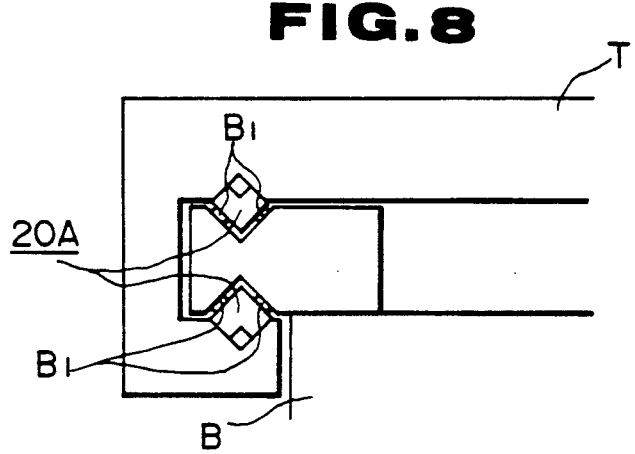
Figure 14:
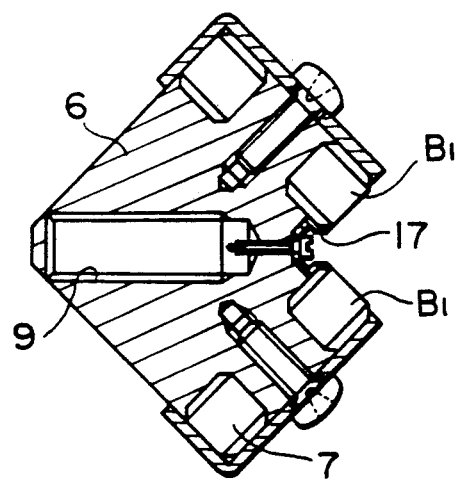
FIG. 14 is a traverse sectional view of a prior art roller bearing.

FIGS. 7 and 8 show modes of use of the roller bearing 20A of the type in the second embodiment in which the loaded rollers B1 are disposed at the outer sides of the bearing body 21. These cases are modifications of the case shown in FIG. 6. In FIG. 7, both the V type roller bearing 20 and the flat type roller bearing 60 of the present invention are used, and on the other hand, in FIG. 8, only the V type roller bearings 20 of the present invention are used.

In each of the embodiments described above, it is described as to the orthogonal V-shaped roller bearing in which the outer side surfaces 24 and 26 of the bearing body 21 intersect at the right angle. However, the present invention is not limited to this, and the roller bearing may be any V shape having an intersection angle of 45 degrees or 120 degrees.

Next, embodiments of a roller type linear guide apparatus will be described.

Figure 9:
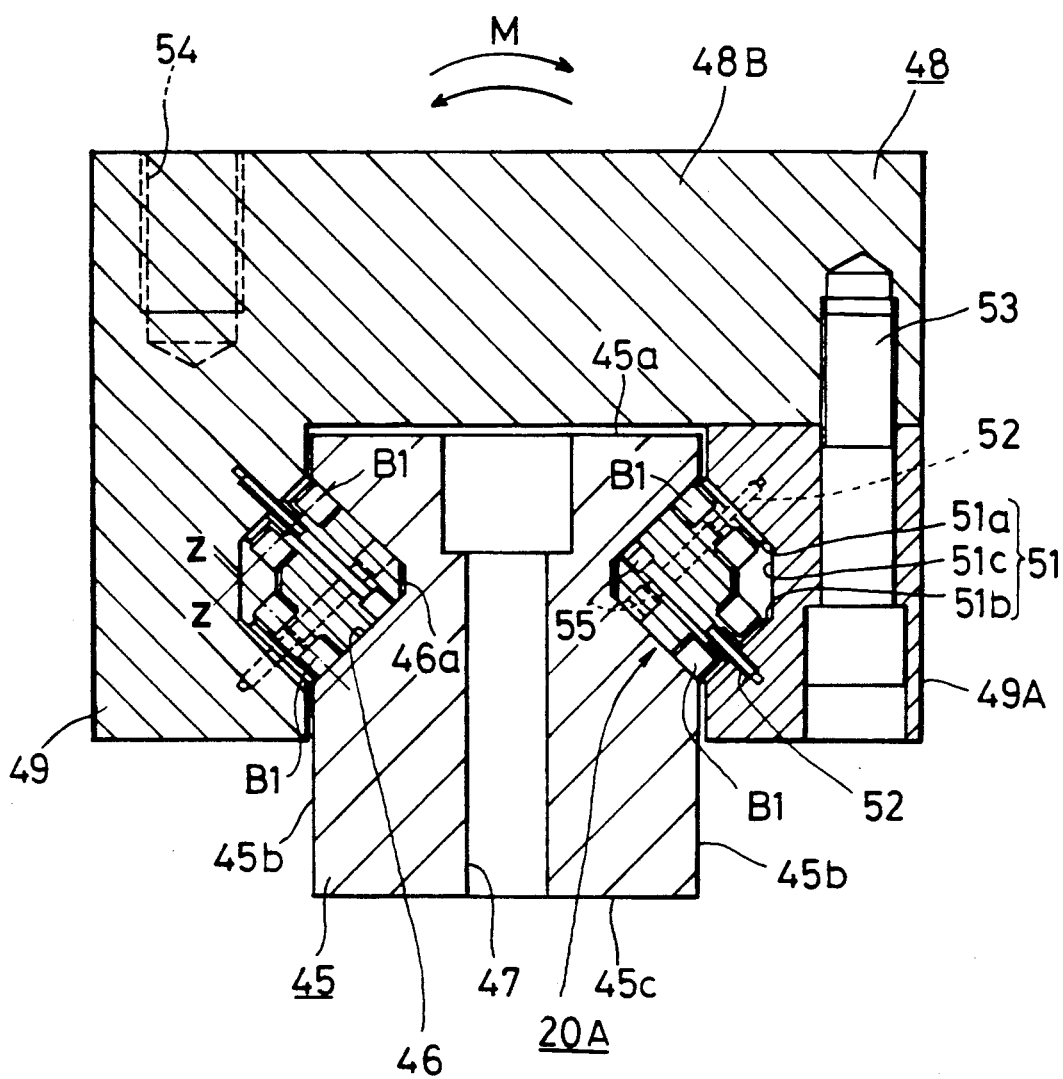
FIG. 9 is a traverse sectional view of an embodiment of a roller type linear guide apparatus in the present invention.

In a roller type linear guide apparatus in FIG. 9, a slider 48 straddles a guide rail 45. The guide rail 45 extends long in an axial direction and has V-shaped roller rolling grooves 46 formed in both lateral side surfaces so that the V-shaped roller rolling grooves 46 extend axially and open outwardly and horizontally. A groove bottom 46a of each V-shaped roller rolling groove 46 is formed in a plane to prevent stress concentration. A fixing bolt hole 47 is formed penetrating from an upper surface 45a through a rail lower surface 45c.

A slider 48 has an inverted U shape and is movable on the guide rail 45 in the axial direction. The slider 48 has V-shaped bearing mounting grooves 51 formed in inner surfaces of both side walls 49 so that the V-shaped bearing mounting grooves 51 respectively correspond to the V-shaped roller rolling grooves 46. Screw holes 52 are respectively formed in groove surfaces 51a and 51b of the V-shaped bearing mounting groove 51, and the groove surfaces 51a and 51b are inclined and facing each other. A groove bottom 51c is formed in a plane to prevent stress concentration. One side wall 49A is formed separate from a slider body 48B, and the side wall 49A is secured by a preload applying bolt 53. A screw hole 54 is formed in an upper surface of the slider 48 to fix a machine table.

The V type roller bearing 20A (shown in FIGS. 2 and 3) having loaded rollers B1 disposed rollably on outer side surfaces is fitted into each of the bearing mounting grooves 51 of the slider 48, and secured by bolts 55 which are screwed to the screw holes 52 of the groove surfaces 51a and 51b. Specifically, inner side surfaces 21a and 21b of the roller bearing 20 are made respectively in contact with the groove surfaces 51a and 51b, and the roller bearing 20 is secured from two directions intersecting each other by bolts 55 which are inserted through the bolt through holes 25 and 27. As a result, the roller bearing 20 can be secured rigidly without producing looseness. In this manner, a circulation plane of an infinitely circulating path C of one roller row of the roller bearing 20 intersects a circulation plane of an infinitely circulating path C of the other roller row at a groove bottom of the bearing mounting groove 51, and the loaded rollers B1 of the two roller roes are disposed in a vertical direction of the guide rail 45 with an interval therebetween.

The slider 48 attached with the roller bearings 20A is fitted about the guide rail 45 from one end of the guide rail 45, and mount the slider 48. At this time, both lateral sides of the slider 48 is sandwiched and pressed, and the bolt 53 is clamped under a condition in which the roller bearings 20 attached to the slider 48 are loaded with a predetermined pressure. Thus, a preload is applied to the loaded rollers B1 of the roller bearings 20.

The guide rail 45 is fixed to the machine bed, and the slider 48 is fixed to the machine table. When the machine table is moved in the axial direction linearly, the loaded rollers B1 of the roller bearing 20A roll on the groove surfaces of the roller rolling grooves 46 of the guide rail 45. With the movement of the slider 48, the roller rows of the cylindrical rollers 33 move while circulating along the infinitely circulating paths C, and the smooth travelling of the machine table is carried out. In this case, each roller bearing 20A is rigidly secured to the groove surfaces 51a and 51b of the V-shaped bearing mounting groove 51 of the slider 48 by the two bolts 55 from two directions along a load direction of the moment load M, and thus, no looseness is produced. Furthermore, the loaded rollers B1 abut against the upper and lower inclined surfaces of the V-shaped roller rolling groove 46 with an interval in a vertical direction, and the loaded rollers B1 bear the load. Accordingly, the rigidity against the moment load M in the rolling direction of the slider 48 is very high.

Figure 10:
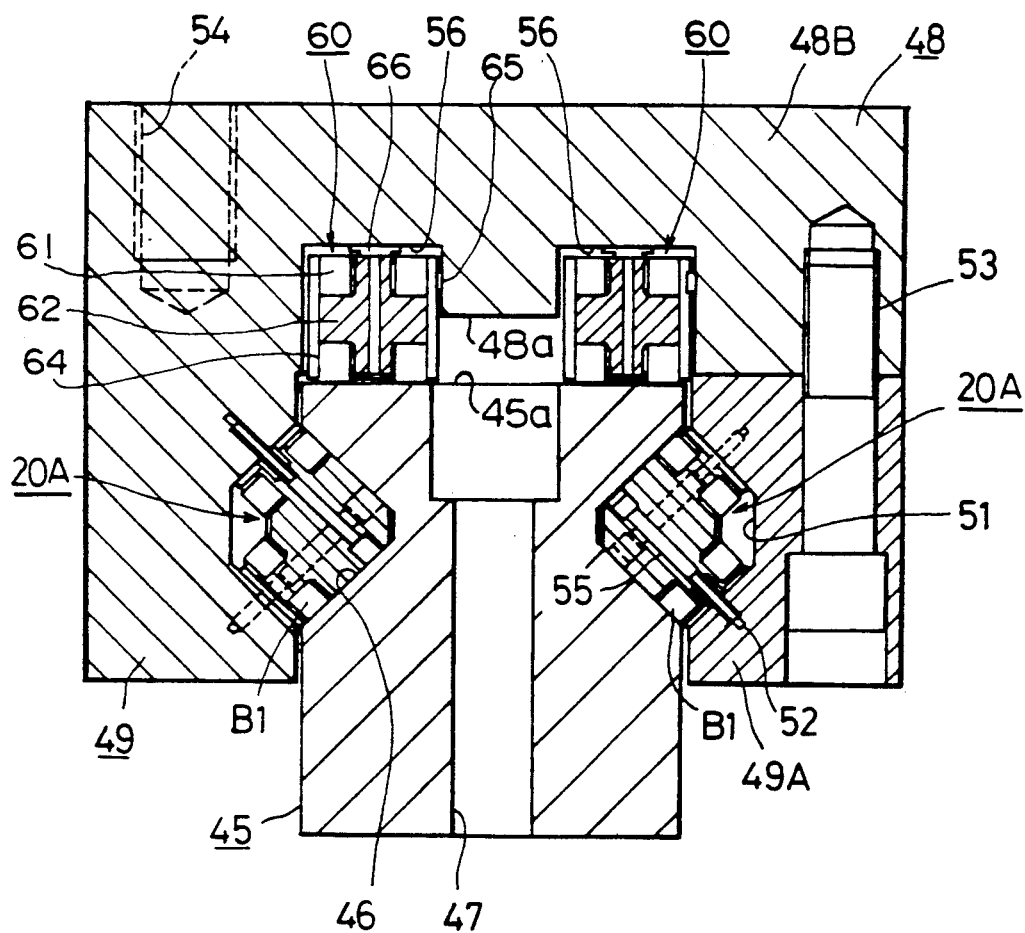
FIG. 10 is a traverse sectional view of another embodiment of a roller type linear guide apparatus in the present invention.

Next, with reference to FIG. 10, another embodiment of a roller type linear guide apparatus of the present invention will be described.

In this embodiment, in an inner surface 48a of a slider 48 opposing an upper surface 45a of a guide rail 45, there are formed with left and right square grooves 56, and flat type roller bearings 60 which are known in the art and which have a rectangular shape are mounted in the square grooves 56. This structure mentioned above is a difference from the roller type linear guide apparatus described with reference to FIG. 9.

Figure 11:
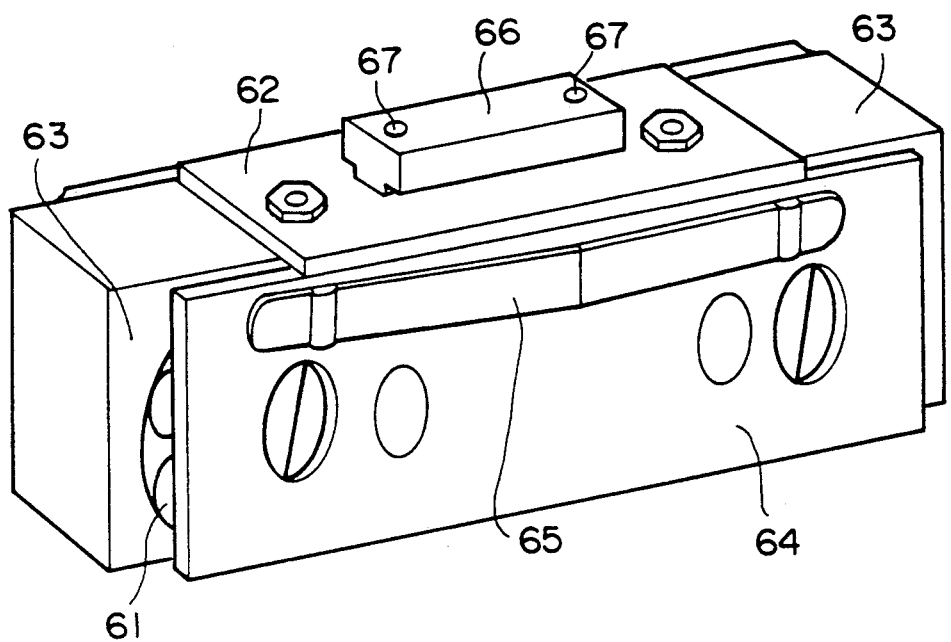
FIG. 11 is a perspective view of the flat type roller bearing in FIG. 10.
Figure 12:
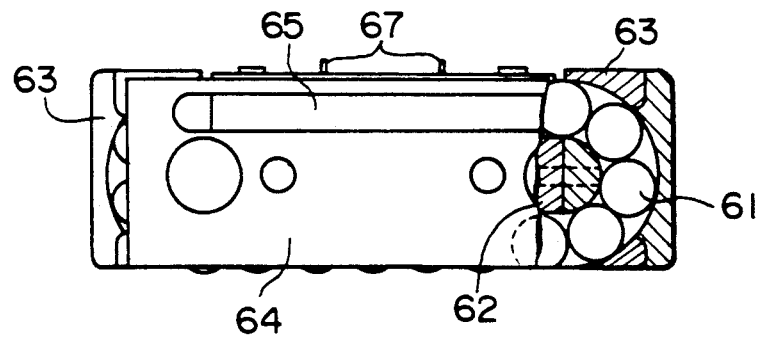
FIG. 12 is a side view a part thereof in cross section of the flat type roller bearing.
Figure 13:
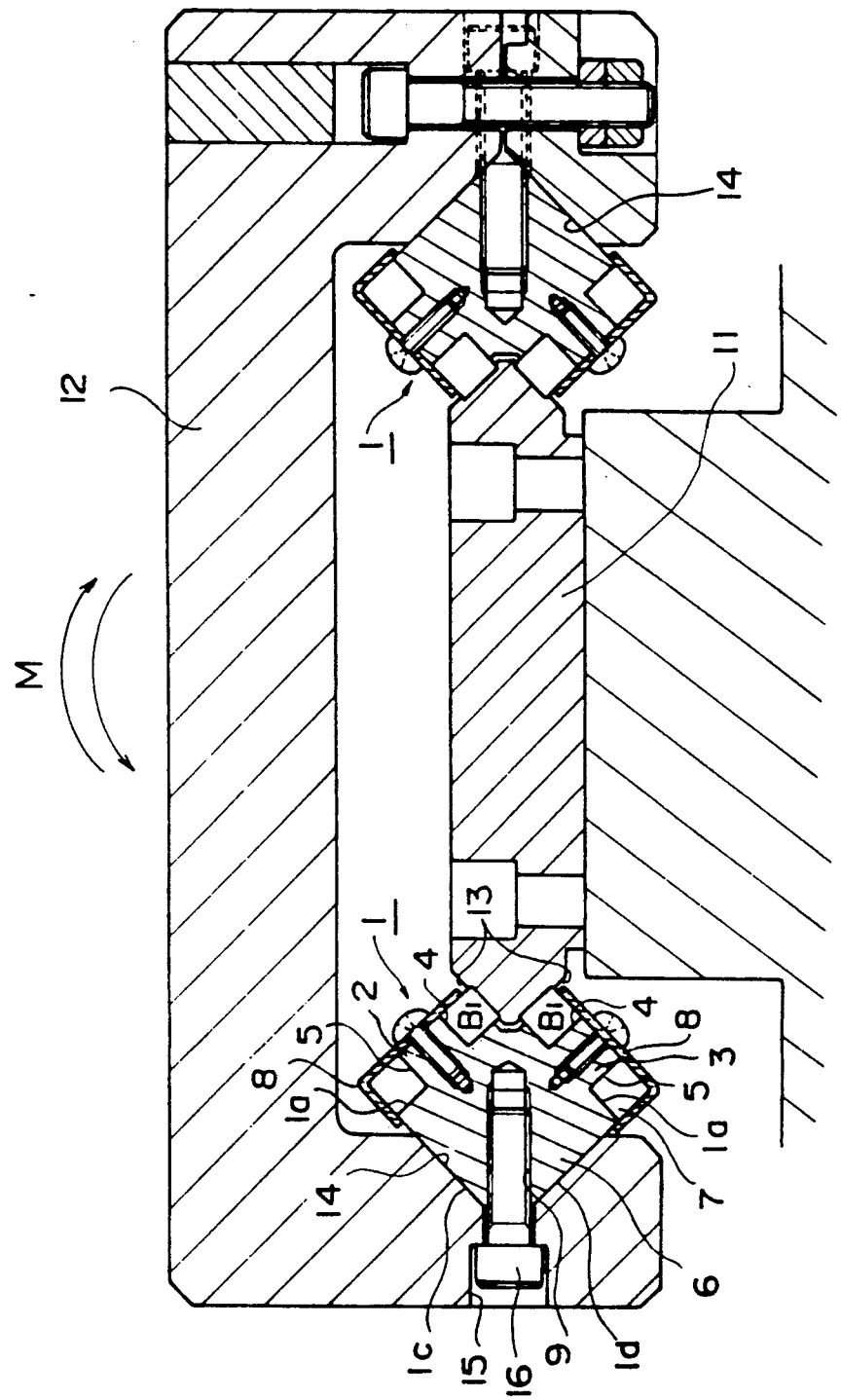
FIG. 13 is a traverse sectional view of a prior art roller type linear guide apparatus.

The flat type roller bearing 60, as shown in FIGS. 11 and 12, includes a main body 62 which has a cross-shaped cross section and which has two rows of multiplicity of rollers 61 disposed in parallel to each other so that each row of rollers 61 infinitely circulate in a vertical direction. The flat type roller bearing 60 further includes end caps 63 for turning a moving direction at opposite ends of the main body 62, and side plates 64 for guiding the rollers 61. The flat type roller bearing 60 is held in the square groove 56 by an elastic force of a leaf spring 65. The reference numeral 66 designates a fitting plate which provides an automatic centering function, and it is fixed to an upper surface of the flat type roller bearing 60 through a spring 67.

In the roller type linear guide apparatus in this embodiment, by interposing the flat type roller bearings 60 between the guide rail 45 and the slider 48, the load capacity for a load applied to the slider 48 downwardly and the rigidity can be improved. The other arrangement and function are the same as the roller type linear guide apparatus shown in FIG. 9.

As described in the foregoing, in the roller type linear guide apparatus in the present invention, the V-shaped roller bearing having the loaded rollers disposed on the outer side surfaces is fixed to the inclined groove surfaces of the V-shaped bearing mounting groove of the slider by two bolts from two different directions, and the loaded rollers are made to abut the inclined groove surfaces of the roller roling groove of the guide rail an to bear the load with the loaded rollers being spaced to each other in the vertical direction. As a result, an advantage is obtained in that the rigidity against the moment of the slider can be improved as compared with the prior art apparatus.

Furthermore, the roller retainers of the roller bearing are formed in a simple L shape or a strip shape, and the roller bearing is fixed to the V-shaped bearing mounting groove of the slider by two bolts from two different directions respectively perpendicular to the inclined groove surfaces of the V-shaped bearing mounting groove. Accordingly, the manufacture is easy and inexpensive, and the retainers do not disturb the rolling of the loaded rollers. In addition, the tapping work for the bolt holes is easy, and the roller bearing can be secured rigidly.

What is claimed is:

1. In a roller type linear guide apparatus having a guide rail extending in an axial direction, and a slider supported by the guide rail through at least a pair of roller bearings so that the slider moves in the axial direction through rolling of rollers of the roller bearing, the improvement comprising:

the guide rail having a pair of V-shaped roller rolling grooves formed in both lateral side surfaces thereof so that the V-shaped grooves open laterally and outwardly;

the slider having a pair of V-shaped bearing mounting grooves formed in inner surfaces of both side walls thereof so that the pair of V-shaped bearing mounting grooves respectively confront the pair of V-shaped roller rolling grooves of the guide rail; and the pair of roller bearings each having two rows of infinitely circulating roller rows respectively mounted in the pair of V-shaped bearing mounting grooves of said slider, wherein in each of the roller bearings, two circulation surfaces for the two rows of infinitely circulating roller rows are formed to intersect in a V shape, and the loaded rollers of one row of the two roller rows roll on one inclined surface of the V-shaped roller rolling groove of the guide rail and the loaded rollers of the other row of the two roller rows roll on the other inclined surface of the V-shaped roller rolling groove of the guide rail.

2. The improvement in a roller type linear guide apparatus according to claim 1 wherein a bolt screw bore is formed in each of the inclined surfaces of the V-shaped bearing mounting groove of the slider, the roller bearing being fixed to the slider by bolts which are screwed into the bolt screw bores.

3. The improvement in a roller type linear guide apparatus according to claim 1 wherein a plane track surface is formed on an upper surface of the guide rail, a recess is formed in a lower surface of the slider to confront the plane track surface, and a flat type roller bearing is mounted in the recess so that loaded rollers of the flat-type roller bearing roll on the plane track surface.

4. A roller bearing comprising:

a bearing body having a substantially V-shaped cross section and extending in an axial direction, the bearing body having two inner longitudinally extending side surfaces, wherein each of the two inner side surfaces is formed with a pair of parallel roller paths partitioned by a partition wall extending in the axial direction, and a plurality of through bores are formed in the bearing body, each of the through bores penetrating from an upper surface of the partition wall through an opposing outer side surface of the bearing body;

end caps respectively fixed to axial opposite ends of the bearing body, each end cap having two curved paths in which each curved path makes the pair of roller paths of the bearing body communicate with to each other;

a plurality of cylindrical roller rollably inserted in elliptic infinitely circulating paths respectively formed by the roller paths and the curved paths, each of the cylindrical rollers having narrow slant surfaces formed in opposite circumferential edges;

a first roller retainer for covering substantially all of the end faces of the cylindrical rollers from the outside and having a fall-off preventing, axially extending projection edge formed on at least one side edge so that the fall-off preventing projection edge being in proximity with one slant surface of the cylindrical roller, the first roller retainer being secured to an upper surface of the partition wall of the bearing body; and a second roller retainer having an axially long strip shape, both side edges of the second roller retainer extending in the longitudinal direction being respectively positioned in proximity with the other slant surfaces of the cylindrical rollers of the two roller rows.

5. The roller bearing according to claim 4 wherein the first roller retainer has a L-shaped cross section, one side of the L-shaped roller retainer has the fall-off preventing projection edge and covers the end faces of the loaded rollers and the non-loaded rollers from the outside, and the other side of the L-shaped roller retainers covers the cylindrical side surfaces of the non-loaded rollers from the outside.

6. The roller bearing according to claim 4 wherein the first roller retainer has a flat shape to cover the loaded rollers and the non-loaded rollers in the roller paths of the same circulating path, and the fall-off preventing projection edges are formed on both side edges of the first roller retainer.

* * * * *